(12) United States Patent
Kameyama et al.

(10) Patent No.: US 7,209,222 B2
(45) Date of Patent: Apr. 24, 2007

(54) LASER RADAR APPARATUS

(75) Inventors: Shumpei Kameyama, Tokyo (JP);
Yoshihito Hirano, Tokyo (JP); Kimio Asaka, Tokyo (JP); Toshiyuki Ando, Tokyo (JP); Atsushi Okamura, Tokyo (JP); Toshio Wakayama, Tokyo (JP); Hiroshi Sakamaki, Tokyo (JP)

(73) Assignee: Mitsubishi Denki Kabushiki Kaisha, Tokoyo (JP)

( * ) Notice: Subject to any disclaimer, the term of this patent is extended or adjusted under 35 U.S.C. 154(b) by 259 days.

(21) Appl. No.: 10/503,212

(22) PCT Filed: Dec. 27, 2002

(86) PCT No.: PCT/JP02/13863

§ 371 (c)(1),
(2), (4) Date: Aug. 3, 2004

(87) PCT Pub. No.: WO2004/061476

PCT Pub. Date: Jul. 22, 2004

(65) Prior Publication Data

US 2005/0146706 A1    Jul. 7, 2005

(51) Int. Cl.
*G01P 3/36*    (2006.01)
(52) U.S. Cl. .................................... 356/28.5
(58) Field of Classification Search ............... 356/28.5
See application file for complete search history.

(56) References Cited

U.S. PATENT DOCUMENTS 4,984,884 A * 1/1991 Ryu et al. .................. 356/73.1
6,281,973 B1 * 8/2001 Trainer ....................... 356/342
6,335,701 B1   1/2002 Fujisaka et al.
6,580,497 B1 * 6/2003 Asaka et al. ............... 356/28.5

FOREIGN PATENT DOCUMENTS

| JP | 51-29032 A | 8/1976 |
| JP | 59-150299 A | 8/1984 |
| JP | 02-025786 A | 1/1990 |
| JP | 09-113217 A | 5/1997 |
| JP | 09-281238 A | 10/1997 |
| JP | 2000-266850 A | 9/2000 |
| JP | 2000-338244 A | 12/2000 |
| JP | 2001-133544 A | 5/2001 |
| JP | 2001-183444 A | 7/2001 |
| JP | 2001-133471 A | 8/2001 |
| WO | WO-03/100458 A1 | 12/2003 |

OTHER PUBLICATIONS

"Noise-Reducing Effects of Signal Processing With an FFT", Stan Goldman, Microwave Systems News & Communications Technology, vol. 18, No. 3, Mar. 1988, pp. 44-52.

* cited by examiner

*Primary Examiner*—Thomas H. Tarcza
*Assistant Examiner*—Luke D. Ratcliffe
(74) *Attorney, Agent, or Firm*—Birch, Stewart, Kolasch, & Birch, LLP.

(57) ABSTRACT

A laser radar apparatus includes a mixer 12 for converting the frequency of an electric signal outputted from a photodetector 11 into a baseband frequency by using a modulating signal generated by an oscillator 2. The laser radar apparatus carries out a coherent integral of the electric signal whose frequency has been converted by the mixer 12, and measures the quality of scatterers which exist in the atmosphere from a result of the integral. As a result, even when the S/N ratio of the light signal received by a receiving optical unit 8 is low, the laser radar apparatus can detect the quality of the scatterers.

15 Claims, 7 Drawing Sheets

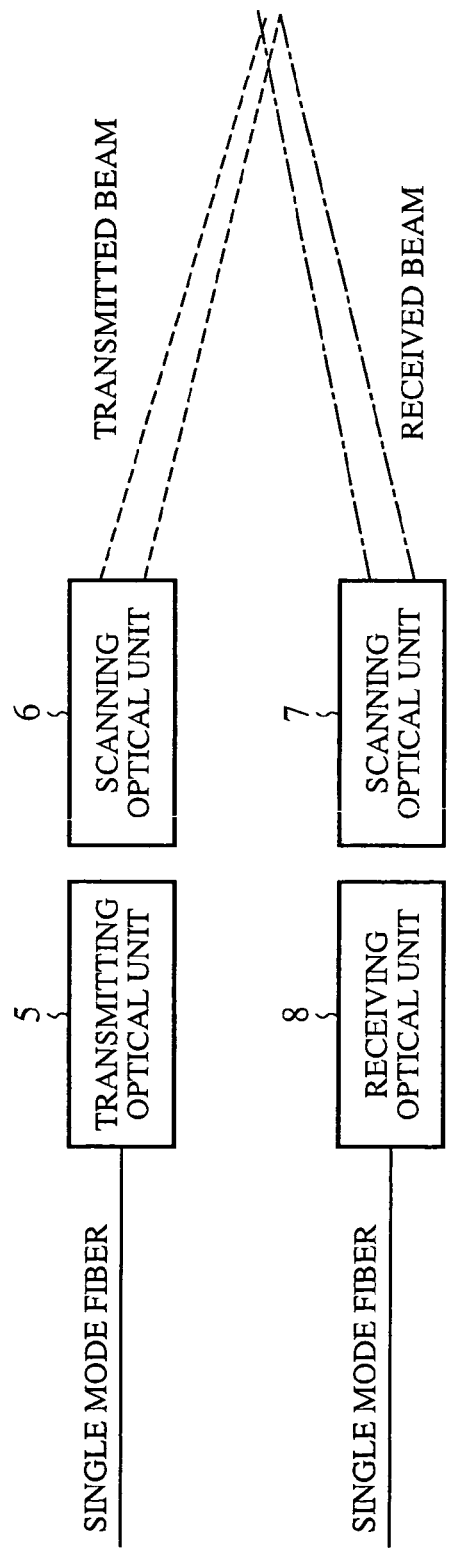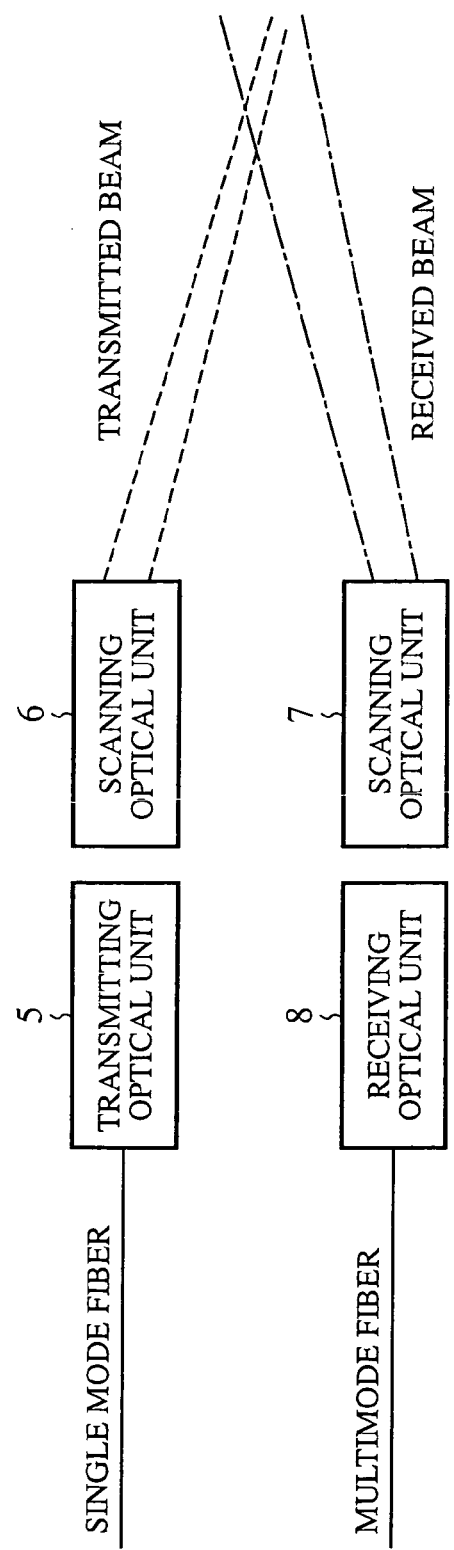

LASER RADAR APPARATUS

FIELD OF THE INVENTION

The present invention relates to a laser radar apparatus that transmits and receives laser light and measures the quality of scatterers in the atmosphere.

BACKGROUND OF THE INVENTION

By transmitting laser light into the atmosphere, a prior art laser radar apparatus receives laser light which has a Doppler frequency shift due to the drift speed of scatterers in the atmosphere, and carries out heterodyne detection of the laser light and local light so as to detect a Doppler signal.

The prior art laser radar apparatus then acquires the drift speed of the scatterers from the frequency of the Doppler signal.

As mentioned above, although the prior art laser radar apparatus employs a method of detecting the Doppler shift frequency for the carrier frequency of the laser light, it is known that this method exhibits weak coherency of the Doppler signal. In other words, it is known that the coherent time of the Doppler signal is short. For example, when the received light is light scattered from aerosols in the atmosphere, it is known that the coherent time of the Doppler signal is of the order of microseconds ($\mu s$).

Thus, when the coherent time of the Doppler signal is short, an incoherent integral of the Doppler signal is carried out so as to obtain an improvement in the S/N ratio of the received light, but it is known that it is difficult to effectively improve the S/N ratio of the received light even if an incoherent integral of the Doppler signal is carried out.

In order to acquire a Doppler signal having a long coherent time, it is known that an intensity modulation of the light signal is carried out by using a frequency (for example, a modulation frequency which falls within a microwave frequency band) lower than that of the light signal, and what is necessary is just to detect the Doppler frequency for this modulation frequency.

Following patent references 1 to 3 disclose laser radar apparatus for carrying out an intensity modulation of a light signal by using a modulation frequency which falls within a microwave frequency band.

Patent reference 1 Japanese patent application publication No. 59-150299

Patent reference 2 Japanese patent publication No. 51-29032

Patent reference 3 Japanese patent application publication No. 2-25786

A problem with the prior art laser radar apparatus constructed as mentioned above is that while it can acquire a Doppler signal having a long coherent time, when the S/N ratio of received light is low, there is a possibility that the prior art laser radar apparatus is not able to detect the quality of scatterers in the atmosphere since it has no means for improving the S/N ratio of received light.

For example, when the scatterers are aerosols in the atmosphere and the prior art laser radar apparatus receives a light signal scattered from aerosols and detects the drift speed (i.e., the air velocity) of the aerosols, the S/N ratio of the received light signal deteriorates greatly as compared with the case where the scatterers are hard targets, such as automobiles.

The present invention is made in order to solve the above-mentioned problems, and it is therefore an object of the present invention to provide a laser radar apparatus that can detect the quality of scatterers in the atmosphere even when the S/N ratio of received light is low.

DISCLOSURE OF THE INVENTION

In accordance with the present invention, there is provided a laser radar apparatus including a frequency conversion means for converting the frequency of an electric signal outputted from a photoelectric conversion means into a baseband frequency by using a modulating signal generated by an oscillation means. The laser radar apparatus carries out a coherent integral of the electric signal whose frequency has been converted by the frequency conversion means, and measures the quality of scatterers which exist in the atmosphere from a result of the integral. As a result, even when the S/N ratio of the light signal received by a receiving means is low, the laser radar apparatus can detect the quality of the scatterers.

BRIEF DESCRIPTION OF THE FIGURES

FIG. 4 is an explanatory drawing schematically showing the visual fields of a transmitted beam and a received beam;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
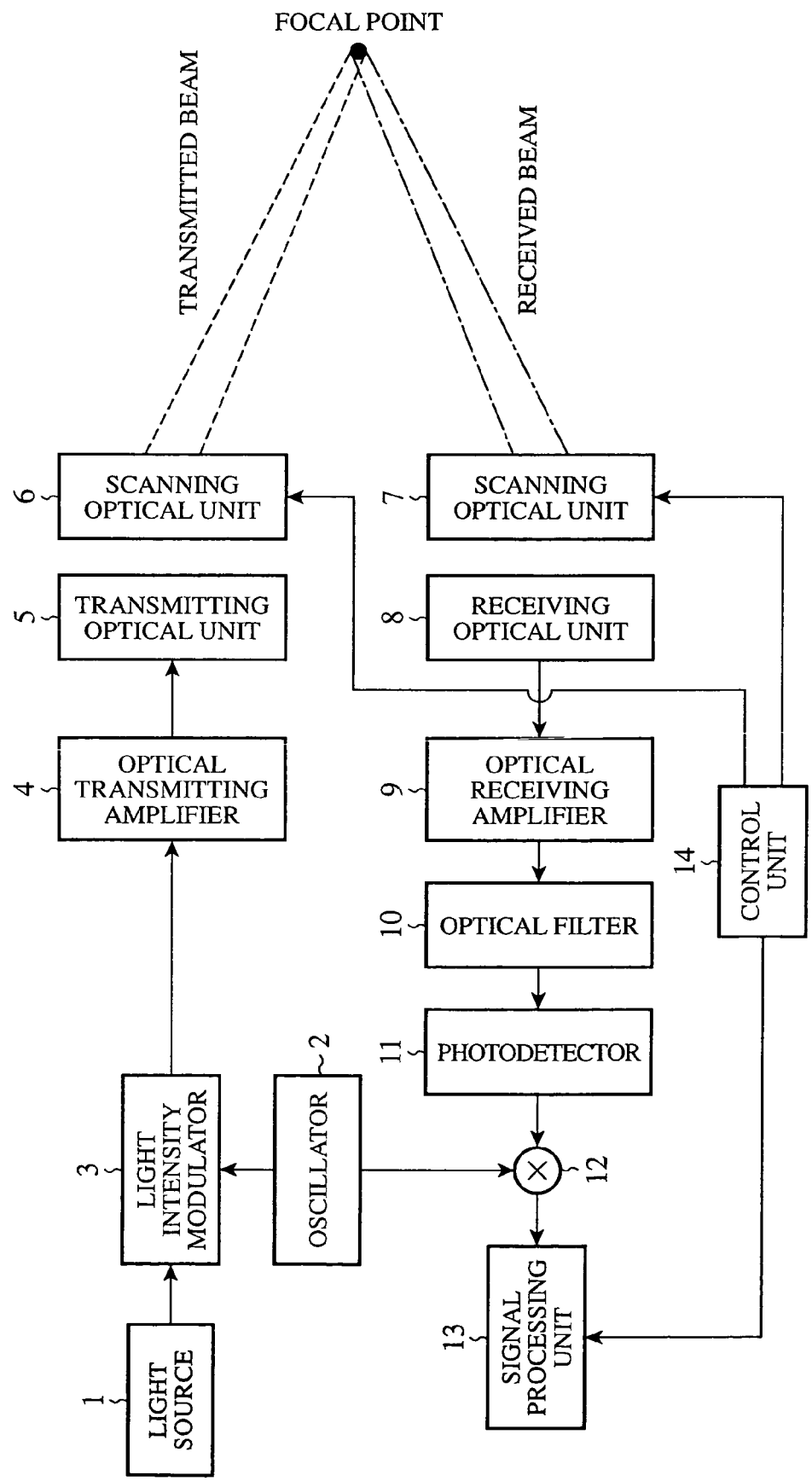
FIG. 1 is a block diagram showing a laser radar apparatus according to embodiment 1 of the present invention.

FIG. 1 is a block diagram showing a laser radar apparatus according to embodiment 1 of the present invention. In the figure, a light source 1 transmits a light signal which consists of a continuous wave, and an oscillator 2 generates a modulating signal which consists of a continuous wave. The oscillator 2 constitutes an oscillation means.

A light intensity modulator 3 performs an intensity modulation on the light signal transmitted from the light source 1 using the modulating signal generated by the oscillator 2. The light intensity modulator 3 constitutes a modulation means.

An optical transmitting amplifier 4 amplifies the light signal intensity-modulated by the light intensity modulator 3, and a transmitting optical unit 5 transmits the light signal amplified by the optical transmitting amplifier 4 into the atmosphere by way of a scanning optical unit 6. The optical transmitting amplifier 4, the transmitting optical unit 5, and the scanning optical unit 6 constitute a transmitting means.

When the transmitting optical unit 5 transmits a light signal into the atmosphere, a receiving optical unit 8 receives the light signal which has undergone a Doppler frequency shift due to scatterers contained in the atmosphere by way of another scanning optical unit 7, an optical receiving amplifier 9 amplifies the light signal received by the receiving optical unit 8, and an optical filter 10 removes unnecessary frequency components contained in the light signal amplified by the optical receiving amplifier 9. The scanning optical unit 7, the receiving optical unit 8, the optical receiving amplifier 9, and the optical filter 10 constitute a receiving means.

By the way, the transmitting optical unit 5 and the receiving optical unit 8 are so constructed as to have focal points at the same location in the atmosphere by virtue of the operations of the scanning optical units 6 and 7.

A photodetector 11 detects an intensity-modulated component contained in the light signal outputted from the optical filter 10, and outputs an electric signal indicating the intensity-modulated component. The photodetector 11 constitutes a photoelectric conversion means.

A mixer 12 mixes the electric signal outputted from the photodetector 11 and the modulating signal generated by the oscillator 2, and then converts the frequency of the electric signal into a baseband frequency. The mixer 12 constitutes a photoelectric conversion means.

A signal processing unit 13 carries out a coherent integral of the electric signal whose frequency has been converted by the mixer 12 so as to detect the quality of the scatterers which exist in the atmosphere from the integral result. The signal processing unit 13 constitutes a detection means.

A control unit 14 controls processes carried out by the scanning optical units 6 and 7 and the signal processing unit 13.

Optical fiber cables connect between the light source 1 and the light intensity modulator 3, between the light intensity modulator 3 and the optical transmitting amplifier 4, and between the optical transmitting amplifier 4 and the transmitting optical unit 5, respectively. Optical fiber cables also connect between the receiving optical unit 8 and the optical receiving amplifier 9, between the optical receiving amplifier 9 and the optical filter 10, and between the optical filter 10 and the photodetector 11, respectively. An electric wire cable connects between other components (for example, between the photodetector 11 and the mixer 12). By using the optical fiber cables for connections between the above-mentioned components, the degree of freedom of arrangement of the components is improved as compared with a case where the light signal is made to spatially propagate in the laser radar apparatus.

Figure 2:
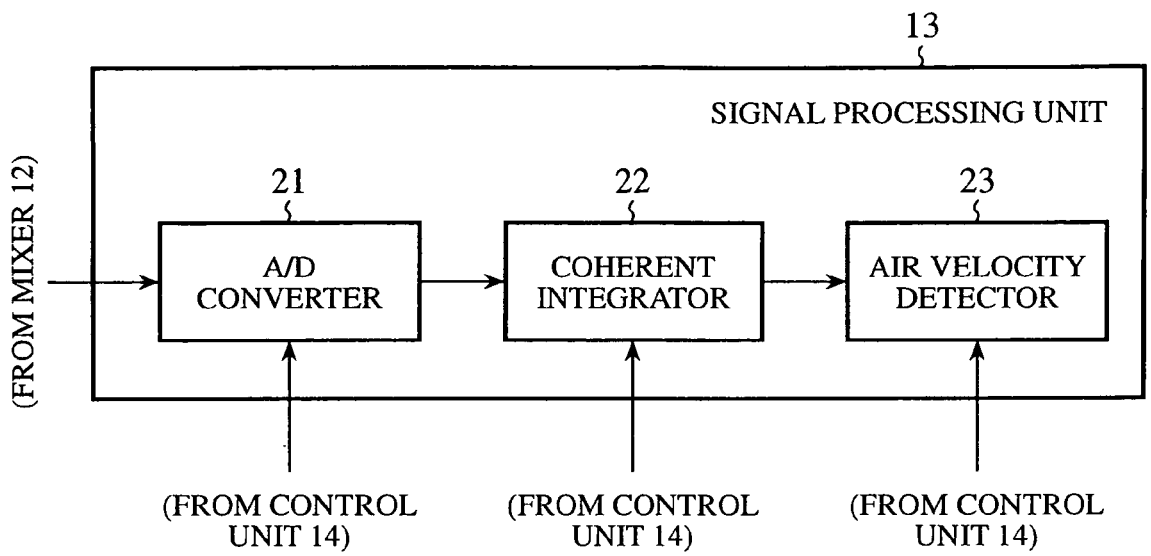
FIG. 2 is a block diagram showing the internal structure of a signal processing unit 13.

FIG. 2 is a block diagram showing the internal structure of the signal processing unit 13. In the figure, an A/D converter 21 converts the analog electric signal whose frequency has been converted by the mixer 12 into a digital signal. A coherent integrator 22 carries out a coherent integral of the digital signal outputted from A/D converter 21 and simultaneously acquires a spectrum of the digital signal. An air velocity detector 23 detects an air velocity in the direction of the transmission of the light signal and in the vicinity of the focal points of the transmitting optical unit 5 and the receiving optical unit 8 from the spectrum acquired by the coherent integrator 22.

An electric wire cable connects among the A/D converter 21, the coherent integrator 22, and the air velocity detector 23.

Next, the operation of the laser radar apparatus in accordance with this embodiment of the present invention will be explained.

For convenience in explaining the operation of the laser radar apparatus, it is assumed that the scatterers are aerosols contained in the atmosphere, and the laser radar apparatus acquires the Doppler frequency of the air velocity for the purpose of the detection of the air velocity (i.e., the detection of the drift speed of the aerosols). However, the laser radar apparatus can be applied to purposes other than the detection of the drift speed of the scatterers, for example, a purpose of acquiring the traveling speed of an automobile.

First, the light source 1 transmits a light signal which consists of a continuous wave, and the oscillator 2 generates a modulating signal which consists of a continuous wave.

Assume that the modulating signal which the oscillator 2 generates has a frequency (i.e., a carrier frequency) equal to a frequency (for example, 2 GHz) that falls within a microwave band usually used by electromagnetic wave Doppler radars. The carrier frequency of this modulating signal is far low as compared with the frequency (for example, 200 THz) of the light signal transmitted from the light source 1.

When receiving the light signal from the light source 1, the light intensity modulator 3 performs an intensity modulation on the light signal using the modulating signal generated by the oscillator 2.

Figure 3A:
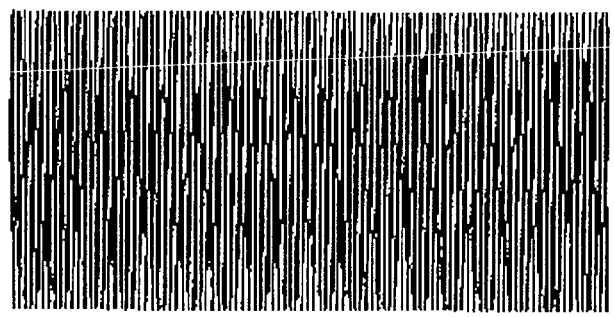
FIG. 3 is an explanatory drawing showing the waveform of a signal which has not been intensity-modulated by a light intensity modulator 3 and the waveform of the signal which has been intensity-modulated by the light intensity modulator 3.
Figure 3B:
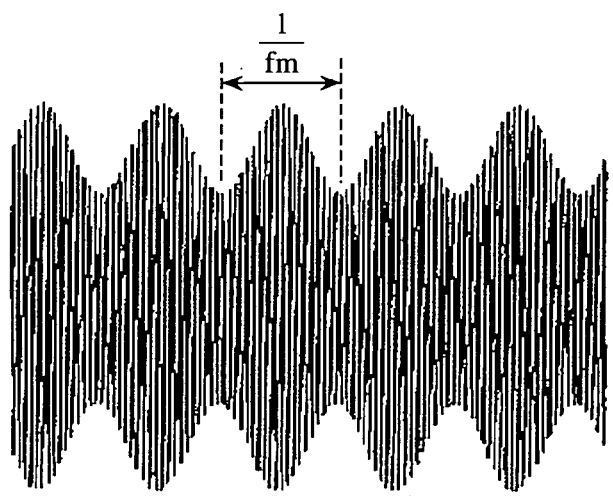

FIG. 3 shows the waveform of the light signal which has not been intensity-modulated by the light intensity modulator 3 and the waveform of the light signal which has been intensity-modulated by the light intensity modulator 3. FIG. 3A shows the waveform of the light signal which has not been intensity-modulated, and FIG. 3B shows the waveform of the light signal which has been intensity-modulated.

When receiving the light signal which has been intensity-modulated from the light-intensity modulator 3, the optical transmitting amplifier 4 amplifies the light signal and the transmitting optical unit 5 transmits the light signal amplified by the optical transmitting amplifier 4 into the atmosphere by way of the scanning optical unit 6.

After the light signal transmitted into the atmosphere is scattered by the aerosols contained in the atmosphere, it is received by the receiving optical unit 8 by way of the scanning optical unit 7.

The light signal received by the receiving optical unit 8 has undergone a Doppler frequency shift under the effect of the drift speed of the scatterers, i.e., the air velocity. In accordance with this embodiment 1, since the light signal sent out by the light source 1 is intensity-modulated by using the modulating signal having a frequency that falls within the microwave band, two types of the Doppler frequency shift appear. One of them is a Doppler frequency shift for the carrier frequency of the light signal, and the other one is a Doppler frequency shift for the modulation frequency.

Here, the Doppler frequency shift $f_{sc}$ for the carrier frequency of the light signal is expressed from the carrier frequency $f_c$ of the light signal, the propagation velocity c of light, and the drift speed v of the scatterers as follows:

$$f_{sc} = (2v \times f_c)/c \qquad (1)$$

On the other hand, the Doppler frequency shift $f_{sm}$ for the modulation frequency is expressed from the modulation frequency (i.e., the carrier frequency of the modulating signal) $f_m$, the propagation velocity c of light, and the drift speed v of the scatterers as follows:

$$f_{sm}=(2v \times f_m)/c \qquad (2)$$

Since the focal points of the transmitting optical unit 5 and the receiving optical unit 8 are placed at the same location, in the light signal received by the receiving optical unit 8, its components scattered from the focal points is in a dominant position.

When the receiving optical unit 8 receives the light signal, the optical receiving amplifier 9 amplifies the light signal and the optical filter 10 removes unnecessary frequency components contained in the light signal amplified by the optical receiving amplifier 9.

When the optical filter 10 removes unnecessary frequency components from the light signal amplified by the optical receiving amplifier 9, the photodetector 11 outputs an electric signal indicating the intensity-modulated component by directly detecting the intensity-modulated component contained in the light signal.

In other words, since the carrier frequency is removed from the light signal when the photodetector 11 directly detects the intensity-modulated component contained in the light signal, only the intensity-modulated component of the light signal is contained in the frequency of the electric signal outputted from the photodetector 11. Therefore, the electric signal outputted from the photodetector 11 has a frequency which is shifted by only the Doppler frequency for the modulation frequency from the modulation frequency provided by the light intensity modulator 3.

When receiving the electric signal from the photodetector 11, the mixer 12 convert the frequency of the electric signal into a baseband frequency by mixing the electric signal and the modulating signal generated by the oscillator 2.

In this case, the baseband frequency is equal to the difference between the frequency of the modulating signal generated by the oscillator 2 (i.e., the modulation frequency provided by the light intensity modulator 3), and the frequency of the electric signal outputted from the photodetector 11 (i.e., the frequency which is shifted from the modulation frequency provided by the light intensity modulator 3 by only the Doppler frequency given by the equation (2)).

In other words, the electric signal outputted from the mixer 12 has the Doppler frequency corresponding to the equation (2) showing the air velocity in the direction of the transmission of the light signal and in the vicinity of the focal points of the transmitting optical unit 5 and the receiving optical unit 8. In accordance with this embodiment 1, for convenience in explaining the operation of the laser radar apparatus, a term "Doppler signal" indicates a signal having a frequency equal to the Doppler frequency for the drift speed of the scatterers, and the electric signal outputted from the mixer 12 is referred to as the Doppler signal from here on.

In accordance with this embodiment 1, the laser radar apparatus converts the frequency of the electric signal into a baseband frequency by using the single mixer 12, as previously mentioned. As an alternative, the laser radar apparatus can carry out multiple-stage mixing, instead of the single-stage mixing, by using modulating signals each of which has a carrier frequency lower than the frequency of the modulating signal generated by the oscillator 2.

For example, the laser radar apparatus can mix the electric signal outputted from the photodetector 11 and a modulating signal having a frequency of ⅓ $f_m$ so as to convert the frequency of the electric signal into an intermediate frequency, and further mixes an output obtained by the previous mixing and another modulating signal having a frequency of ⅔ $f_m$ so as to convert the frequency of the output into a baseband frequency. In this case, although not shown in FIG. 1, the laser radar apparatus is so simply constructed as to further include an oscillator for generating the modulating signal having the frequency of ⅓ $f_m$, an oscillator for generating the other modulating signal having the frequency of ⅔ $f_m$, and another mixer other than the mixer 12. By thus using the modulating signals having lower frequencies for the mixing, the laser radar apparatus offers an advantage of easily lengthening the coherency of the modulating signals, i.e., the coherent times of the modulating signals, and therefore making the Doppler signal coherent.

In general, the coherent time of the Doppler signal is inversely proportional to the frequency of the sent-out signal. Therefore, the coherent time of the Doppler signal for the modulation frequency provided by the light intensity modulator 3 is far long as compared with the coherent time of the Doppler signal for the carrier frequency of the light signal.

For example, when an intensity modulation is performed on the light signal having a frequency of 200 THz (i.e., a wavelength of 1.5 micrometers) with the modulation frequency of 2 GHz, the coherent time of the Doppler signal for the modulation frequency is about 100,000 times as long as that of the Doppler signal for the carrier frequency of the light signal. The carrier frequency fm of the modulating signal is determined from a required coherent time $\tau_r$ and a constant k as follows:

$$f_m = k/\tau_r \qquad (3)$$

Concretely, in the case where the light signal has a frequency of 200 THz, the constant k can be set to k=2×10⁶ by taking into consideration that the coherent time of the Doppler signal is about 1 microsecond.

When receiving the Doppler signal from the mixer 12, as mentioned above, the signal processing unit 13 carries out a coherent integral of the Doppler signal so as to detect the quality of the scatterers which exist in the atmosphere from the integral result.

In other words, the A/D converter 21 of the signal processing unit 13 carries out an A/D conversion of the Doppler signal outputted from the mixer 12, and outputs an obtained digital signal to the coherent integrator 22.

At this time, sampling intervals at which the digital signal is sampled are of an order corresponding to a desired distance resolution, and, for example, is of the order of the focal length of the transmitting optical unit 5 and the receiving optical unit 8.

When receiving the digital signal from the A/D converter 21, the coherent integrator 22 carries out a coherent integral of the digital signal and simultaneously acquires a spectrum of the Doppler signal by carrying out an FFT (Fast Fourier Transform) operation, etc. on the digital signal.

According to this operation, the S/N ratio of the received light signal can be improved in proportion to the number of samples. A reference (written by S. Goldman, Microwave System News & Communication Technology, vol. 18-3, 44–52, (1988)) shows that an FFT operation performed on a sampled signal yields a coherent integral of the signal. As an alternative, by using a method other than FFT, such as DFT (Discrete Fourier Transform), PP (Pulse Pair), or PPP (Poly Pulse Pair), the coherent integral of the digital signal can be carried out.

Instead of performing the coherent integral of the whole of the digital signal at once, the coherent integrator 2 can divide the digital signal into some parts according to time gates each having a time width determined by the reciprocal of the Doppler frequency which corresponds to a desired speed resolution, and further carries out a coherent integral of coherent integral results each obtained for each time gate over all the time gates, thereby providing another advantage. For example, when the number of samples of the digital signal is A and each sample of this digital signal is divided into B parts according to time gates, the number of times that operations are performed is equal to $A\log_2 A$ in case where FFT is performed on the whole of the digital signal. In contrast, in case where FFT is performed for every time gate, the number of times that operations are performed is equal to $(A/B) \times (B\log_2 B) = A\log_2 B$. It is therefore apparent from $A>B$ that the integral result is obtained in a shorter time and with a fewer number of times that operations are performed in the case of the coherent integral of results obtained by performing an FFT operation for every time gate. In this case, since the time width of each time gate is set to the reciprocal of the Doppler frequency corresponding to the desired speed resolution, a frequency resolution for the FFT results is equal to the Doppler frequency corresponding to the desired speed resolution. Therefore, the desired speed resolution can be surely provided.

The air velocity detector 23 of the signal processing unit 13 detects the air velocity in the direction of the transmission of the light signal and in the vicinity of the focal point of the transmitting optical unit 5 and the receiving optical unit 8 from the spectrum acquired by the coherent integrator 22.

As can be seen from the above description, according to this embodiment 1, the laser radar apparatus includes the mixer 12 for converting the frequency of an electric signal outputted from the photodetector 11 into a baseband frequency by using the modulating signal generated by the oscillator 2 and is so constructed as to carry out a coherent integral of the electric signal whose frequency has been converted by the mixer 12 so as to detect the quality of scatterers which exist in the atmosphere from the integral result. Even when the S/N ratio of a light signal received by the receiving optical unit 8 is low, the laser radar apparatus can detect the quality of scatterers which exist in the atmosphere.

In addition, according to this embodiment 1, the laser radar apparatus is so constructed as to divide an obtained digital signal into some parts according to time gates each having a time width determined by the reciprocal of a desired speed resolution, and to carry out a coherent integral of the digital signal for each time gate and further carry out a coherent integral of coherent integral results each obtained for each time gate over all the time gates. Therefore, since the number of times that operations are performed is reduced, the laser radar apparatus can obtain the coherent integral result of the digital signal in a short time. The present embodiment offers another advantage of being able to surely provide a desired speed resolution.

Furthermore, according to this embodiment 1, since when the oscillator 2 generates a modulating signal, the laser radar apparatus determines the carrier frequency $f_m$ of the modulating signal so that the product of the carrier frequency $f_m$ and coherent time $\tau_r$ of the modulating signal agrees with a constant k, the present embodiment offers a further advantage of being able to carry out the coherent integral within a measurement time period.

According to this embodiment 1, since the laser radar apparatus is so constructed as to convert the frequency of the electric signal outputted from the photodetector 11 into a baseband frequency by using the mixer 12 for mixing the electric signal and the modulating signal generated by the oscillator 2, the present embodiment offers another advantage of being able to acquire an electric signal having the baseband frequency without complicating the structure of the laser radar apparatus.

In addition, according to this embodiment 1, the laser radar apparatus includes two or more mixing stages for mixing modulating signals and the electric signal, respectively. Therefore, the present embodiment offers a further advantage of being able to lengthen the coherent times of the modulating signals easily, thereby making the Doppler signal coherent.

According to this embodiment 1, while amplifying the light signal intensity-modulated and transmitting the light signal into the atmosphere, the laser radar apparatus amplifies a light signal received from the atmosphere and removes unnecessary frequency components contained in the received light signal. Therefore, the present embodiment offers a further advantage of being able to improve the accuracy of detection of the quality of the scatterers.

Furthermore, according to this embodiment 1, the laser radar apparatus uses the photodetector 11 for directly detecting an intensity-modulated component contained in the light signal received by the receiving optical unit 8. Therefore, the present embodiment offers another advantage of being able to measure the quality of the scatterers with a stable S/N ratio which is not influenced by fluctuations of the polarized wave plane which a light signal propagating through an optical fiber generally undergoes. Single mode fibers need not be used as the optical fiber cables, and multimode fibers can be used as the optical fiber cables.

Therefore, the present embodiment offers a further advantage of being able to widen the visual fields of the transmitting optical unit 5 and the receiving optical unit 8, and to easily make the focal points of the transmitting optical unit 5 and the receiving optical unit 8 agree with each other in the atmosphere.

In this embodiment 1, the carrier frequency of the signal transmitted by the laser radar apparatus is strictly that of the light signal. Therefore, the laser radar apparatus can continuously hold superiority in spatial resolution and local measurements over electromagnetic wave Doppler radar apparatus, for example.

In addition, in accordance with this embodiment 1, the laser radar apparatus is provided with the optical transmitting amplifier 4, the optical receiving amplifier 9, and the optical filter 10. However, if a sufficient S/N ratio of the received light signal is obtained even if the laser radar apparatus doesn't include these components, the laser radar apparatus need not include the components. However, when it is difficult to measure the quality of the scatterers with a sufficient S/N ratio or when the receiving sensibility to the received light is insufficient, it is desirable that the laser radar apparatus is provided with at least one of the optical transmitting amplifier 4, the optical receiving amplifier 9, and the optical filter 10 in view of improvements in the S/N ratio of the received light.

Furthermore, according to this embodiment 1, the laser radar apparatus detects the Doppler frequency for signals having frequencies that fall within a microwave band, and can be applied to all methods about electromagnetic wave radars using frequencies that fall within a microwave band. Therefore, instead of assigning only one frequency to the modulating signal generated by the oscillator 2, it is possible to assign two or more frequencies to the modulating signal and apply the laser radar apparatus of this embodiment to measurement of the location of a scatterer that is a hard target, such as an automobile, by using an FMCW method, which is known as one of electromagnetic wave radar systems that can sweep the two or more modulation frequencies.

In this case, the scanning optical units 6 and 7 are set so that the transmitted beam from the transmitting optical unit 5 closely matches with the beam received by the receiving optical unit 8, in contrast to the case as shown in FIG. 1. Thereby, if scatters exist in the transmitted beam and in the received beam even if no scatterers exist at the focal point of the scanning optical units shown in FIG. 1, light signals scattered by the scatterers can be received by the laser radar apparatus.

Embodiment 2

In accordance with above-mentioned embodiment 1, the laser radar apparatus converts the frequency of the electric signal into a baseband frequency by using the mixer 12, as previously explained. In contrast, a laser radar apparatus in accordance with embodiment 2 is so constructed as to use an IQ detector circuit, instead of the mixer 12, and to make the IQ detector circuit output an IQ video signal as a Doppler signal.

Thereby, the signal processing unit 13 can identify not only the absolute value of the air velocity but the sign + or − of the air velocity, i.e., whether the blowing winds are following or head ones.

Embodiment 3

In accordance with above-mentioned embodiment 1, the laser radar apparatus is equipped with the transmitting optical unit 5 and the receiving optical unit 8, as previously explained. In contrast, a laser radar apparatus in accordance with embodiment 3 is so constructed as to have one optical member provided with the functionalities of the transmitting optical unit 5 and the receiving optical unit 8.

This single optical member can be provided with the functionality of an optical circulator. Since the single optical member has a focal point for transmission and a focal location for reception that essentially match with each other, the system can be easily constructed.

Embodiment 4

Although no mention is made in above-mentioned embodiment 1, each of the optical fiber cables arranged between the light source 1 and the transmitting optical unit 5 can be constructed of a single mode fiber, and each of the optical fiber cables arranged between the receiving optical unit 8 and the photodetector 11 can be constructed of a multimode fiber.

FIG. 4A schematically shows the visual fields of a transmitted beam and a received beam at the time of using single mode fibers as the optical fiber cables for both transmission and reception, and FIG. 4B schematically shows the visual fields of a transmitted beam and a received beam at the time of using single mode fibers as the optical fiber cables for transmission and using multimode fibers as the optical fiber cables for reception.

As shown in FIG. 4A, when single mode fibers are used as the optical fiber cables for both transmission and reception, since the visual fields of the transmitted beam and the received beam can be narrowed, measurements with a high spatial resolution can be carried out while it is difficult to make the focal points of the transmitted beam and the received beam match with each other. In addition, when the speed of scanning the transmitted beam and the received beam is increased by the scanning optical units 6 and 7, since the visual field of the received beam moves to another position before the transmitted light is scattered by scatterers and the received light is received, the receiving efficiency at the time of receiving the light scattered by the scatterers decreases.

On the other hand, as shown in FIG. 4B, when single mode fibers are used as the optical fiber cables for transmission and multimode fibers are used as the optical fiber cables for reception, and the visual field for reception is made to be wider than that for transmission, it is possible to easily make the focal points of the transmitted beam and the received beam match with each other and to measure the quality of scatterers with a high spatial resolution. Since the visual field of the received beam is wide even if the speed of scanning the beams is increased, a higher receiving efficiency can be provided as compared with the case where single mode fibers are used as the optical fiber cables for both transmission and reception.

Embodiment 5

Figure 5:
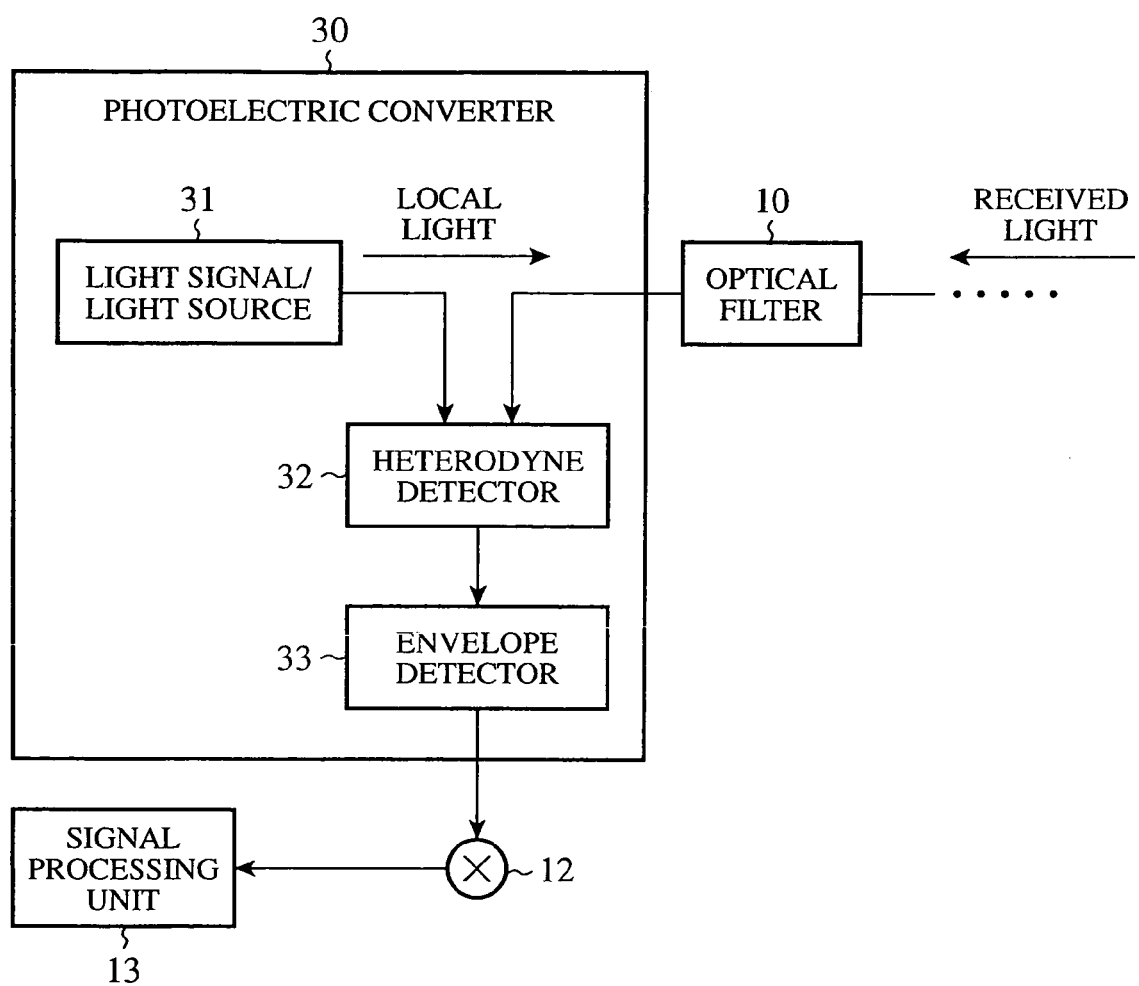
FIG. 5 is a block diagram showing a photoelectric conversion unit 30 of the laser radar apparatus according to embodiment 1 of the present invention.

FIG. 5 is a block diagram showing a photoelectric conversion unit 30 of a laser radar apparatus according to embodiment 1 of the present invention. In the figure, the photoelectric conversion unit 30 is disposed instead of the photodetector 11 of FIG. 1. The photoelectric conversion unit 30 constitutes a photoelectric conversion means for converting an intensity-modulated component contained in a light signal outputted from an optical filter 10 into an electric signal.

A light source 31 outputs local light and a heterodyne detector 32 carries out heterodyne detection of the light signal outputted from the optical filter 10 and the local light outputted from the light source 31. An envelope detector 33 detects an envelope of a detection signal of the heterodyne detector 32.

In accordance with this embodiment 5, the heterodyne detector 32 carries out heterodyne detection of the light signal outputted from the optical filter 10 and the local light outputted from the light source 31, and the envelope detector 33 detects the envelope of the detection signal of the heterodyne detector 32. As a result, the laser radar apparatus according to this embodiment outputs the detection result of the envelope to a mixer 12 as an electric signal indicating an intensity-modulated component contained in the light signal, and can provide a high SIN ratio under the effect of the heterodyne detection. However, since the laser radar apparatus according to this embodiment employs the heterodyne detection, there is a necessity to use single mode fibers as the optical fiber cables.

Although the light source 31 is disposed in addition to the light source 1, as shown in FIG. 5, an optical divider, not shown in the figure, for dividing the light signal from the light source 1 into two parts can be disposed, instead of the other light source 31, and one of them can be used as the local light.

Embodiment 6

Figure 6:
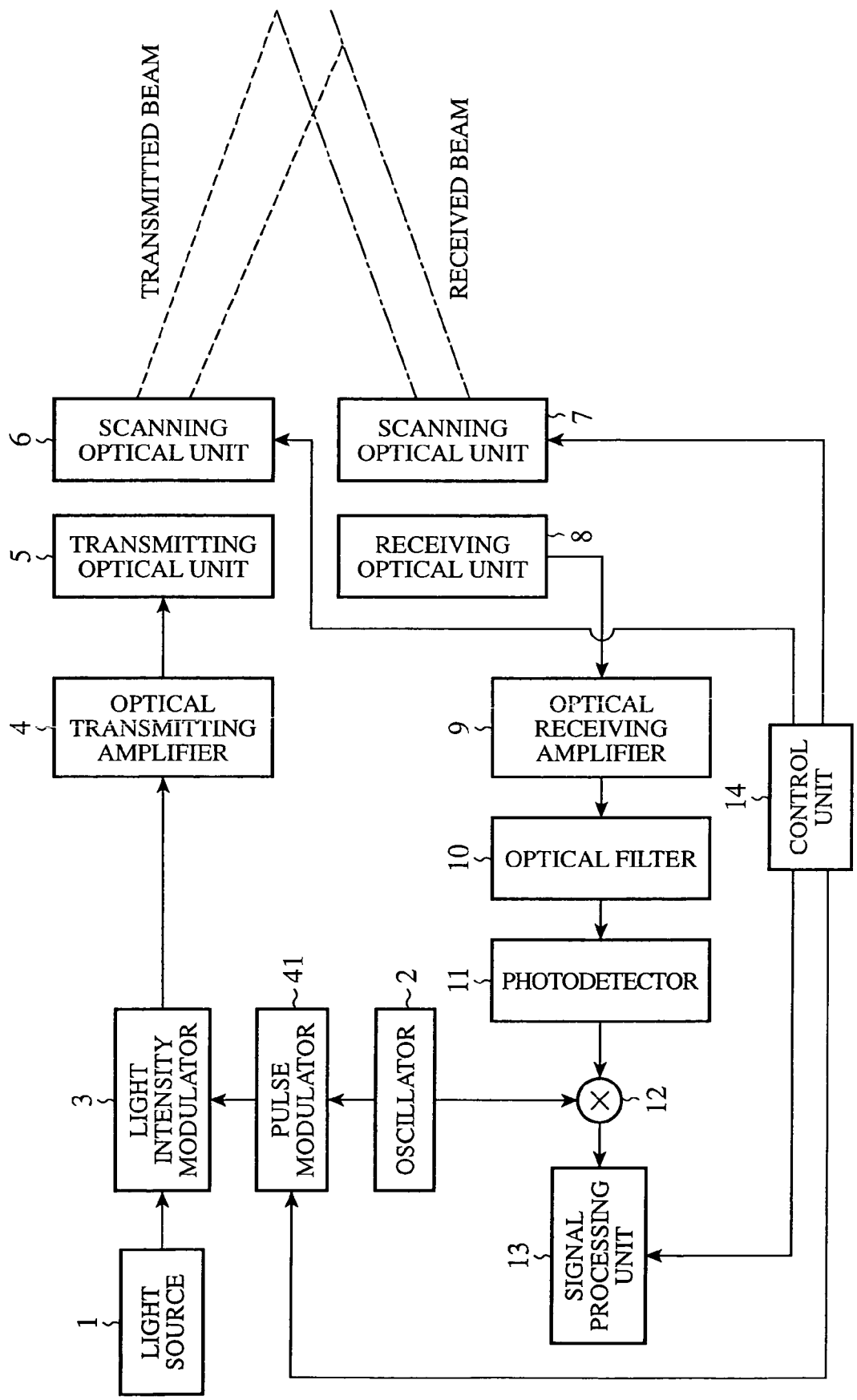
FIG. 6 is a block diagram showing a laser radar apparatus according to embodiment 6 of the present invention.

FIG. 6 is a block diagram showing a laser radar apparatus according to embodiment 6 of the present invention. In the figure, since the same reference numerals as shown in FIG. 1 denote the same components as those of embodiment 1 or like components, the explanation of those components will be omitted hereafter.

A pulse modulator 41 modulates a signal using a modulating signal generated by an oscillator 2 to generate a pulse having a time width equivalent to a desired distance resolution. The pulse modulator 41 then outputs the pulse signal to a light intensity modulator 3. Electric wire cable connect between the oscillator 2 and the pulse modulator 41, between the pulse modulator 41 and the light intensity modulator 3, and between the pulse modulator 41 and a control unit 14, and the pulse modulator 41 constitutes an oscillation means.

Next, the operation of the laser radar apparatus in accordance with this embodiment of the present invention will be explained.

However, the explanation of the same portion as that of the laser radar apparatus according to above-mentioned embodiment 1 will be omitted hereafter.

When receiving a modulating signal which consists of a continuous wave from the oscillator 2, the pulse modulator 41 modulates a signal with the modulating signal so as to generate a pulse having a time width equivalent to a desired distance resolution, and then outputs the pulse signal to the light intensity modulator 3.

Here, a relationship between the desired distance resolution and the time width of the pulse is expressed from the desired distance resolution d and the time width w of the pulse as follows:

$$d = c \times w / 2 \quad (4)$$

For example, when the desired distance resolution is 150 m, the time width of the pulse is set to 1 microsecond.

In FIG. 6, the scanning optical units 6 and 7 are so set that a beam transmitted by a transmitting optical unit 5 closely matches with a beam received by a receiving optical unit 8. Furthermore, the transmitted beam and the received beam are approximately placed in an unfocal state of not having any focal point.

According to this embodiment 6, the light intensity modulator 3 carries out an intensity modulation of the light signal transmitted from the light source 1 using the pulse signal outputted from the pulse modulator 41, and the transmitting optical unit 5 transmits the light pulse into the atmosphere. Therefore, since the receiving optical unit 8 receives light signals scattered from two or more ranges in the atmosphere, Doppler frequencies of the Doppler signal for two or more time zones respectively corresponding to the two or more ranges can be detected. As a result, the present embodiment offers an advantage of being able to detect the air velocity in the direction of the transmission of the light pulse for each of the two or more ranges and hence to provide a distribution of the air velocity in the atmosphere.

Embodiment 7

Figure 7:
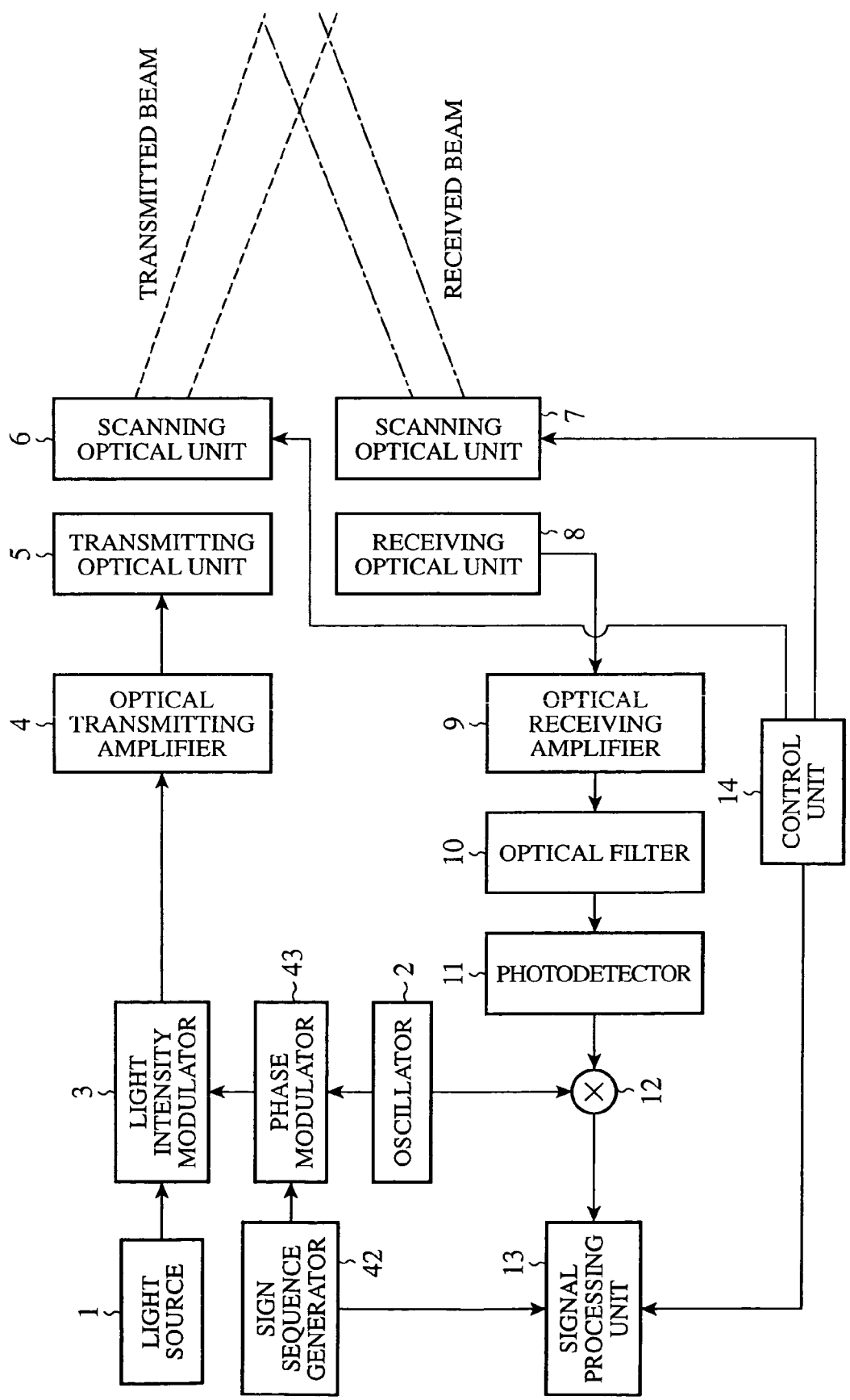
FIG. 7 is a block diagram showing a laser radar apparatus according to embodiment 7 of the present invention.

FIG. 7 is a block diagram showing a laser radar apparatus according to embodiment 7 of the present invention. In the figure, since the same reference numerals as shown in FIG. 1 denote the same components as those of embodiment 1 or like components, the explanation of those components will be omitted hereafter.

A sign sequence generator 42 generates a sign sequence which consists of signs each of which is + or −, and a phase modulator 43 modulates the phase of a modulation signal generated by the oscillator 2 using the sign sequence generated by the sign sequence generator 42. The sign sequence generator 42 and the phase modulator 43 constitute an oscillation means.

Electric wire cables connect between the sign sequence generator 42 and the phase modulator 43, between the sign sequence generator 42 and a signal processing unit 13, between the phase modulator 43 and an oscillator 2, and between the phase modulator 43 and a light intensity modulator 3.

Figure 8:
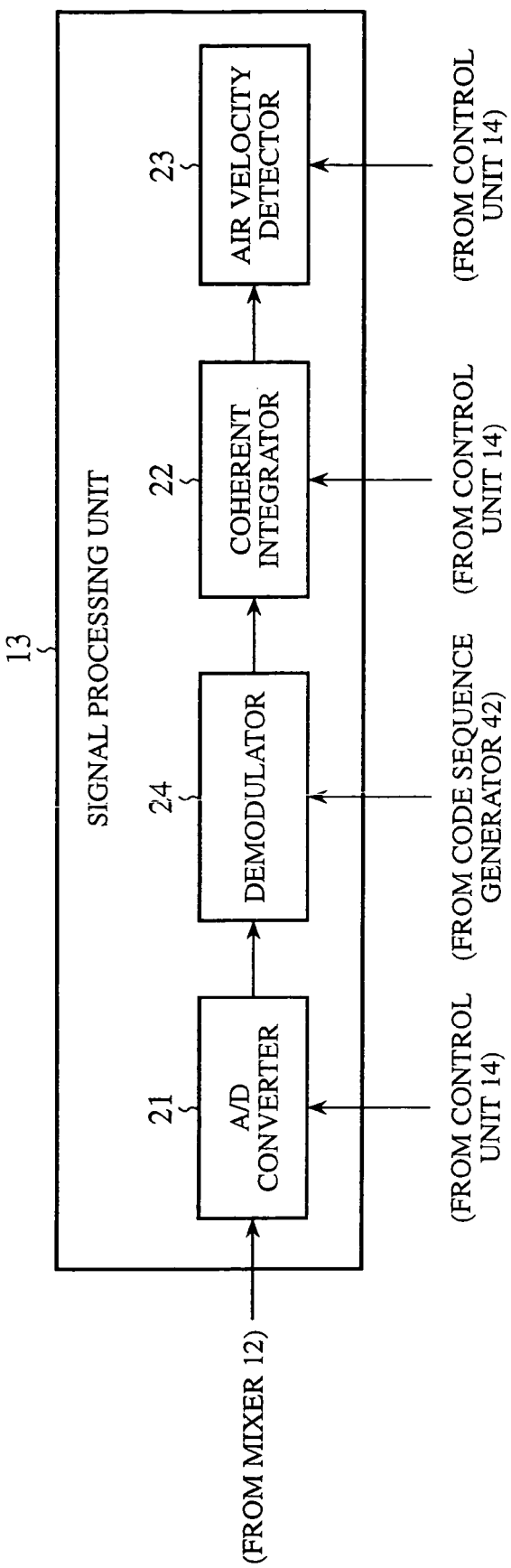
FIG. 8 is a block diagram showing the internal structure of a signal processing unit 13.

FIG. 8 is a block diagram showing the internal structure of the signal processing unit 13. In the figure, since the same reference numerals as shown in FIG. 2 denote the same components as those of the signal processing unit 13 of embodiment 1 or like components, the explanation of those components will be omitted hereafter.

A demodulator 24 performs a demodulation process on a digital signal outputted by an A/D converter 21 based on the sign sequence generated by the sign sequence generator 42.

Next, the operation of the laser radar apparatus in accordance with this embodiment of the present invention will be explained.

However, the explanation of the same portion as that of the laser radar apparatus according to above-mentioned embodiment 1 will be omitted hereafter.

The sign sequence generator 42 generates a sign sequence which consists of signs each of which is + or −. The sign sequence simply has a sharp peak at a delay time of 0 in an autocorrelation function thereof and includes a set of signs periodically repeated. An M sequence signal can be provided as an example of the sign sequence. Hereafter, the operation of the laser radar apparatus will be explained by assuming that the laser radar apparatus uses an M sequence signal as the sign sequence.

When the sign sequence generator 42 generates an M sequence signal, the phase modulator 43 modulates the phase of the modulation signal generated by the oscillator 2 using the M sequence signal.

In other words, the phase modulator 43 performs a phase modulation with a phase of 0 or $\pi$ on the modulation signal based on the M sequence signal, and transmits this signal as a modulated signal to the light intensity modulator 3. Each bit of the phase-modulated signal has a time width equivalent to a desired distance resolution.

Thereby, a beam transmitted by a transmitting optical unit 5 becomes a signal having a duty ratio of 100%, which is pseudo-random-modulated with the M sequence signal.

In FIG. 7, scanning optical units 6 and 7 are so set that the beam transmitted by the transmitting optical unit 5 closely matches with a beam received by a receiving optical unit 8. Furthermore, the transmitted beam and the received beam are approximately placed in an unfocal state of not having any focal point.

Therefore, rays of light scattered by two or more ranges in the atmosphere are superimposed on and contained in the beam received by the receiving optical unit 8.

When receiving a Doppler signal from the mixer 12, the signal processing unit 13 carries out a coherent integral of the Doppler signal and measures the quality of scatterers which exist in the atmosphere from the integral result, like that of the laser radar apparatus of above-mentioned embodiment 1.

In other words, the A/D converter 21 of the signal processing unit 13 carries out A/D conversion of the Doppler signal outputted from the mixer 12, and outputs a digital signal to the demodulator 24.

The demodulator 24 of the signal processing unit 13 performs a demodulation process on the digital signal outputted from the A/D converter 21 based on the sign sequence generated by the sign sequence generator 42.

To be more specific, the demodulator 24 selects one range in the atmosphere which is a target for measurement of the air velocity, and sets a delay time, i.e., a time that lapses until transmitted light scattered by scatterers located in this selected range is received as received light since the transmitted light has reached the range to τ. Hereafter, the selected range is referred to as the measurement range.

The demodulator 24 multiplies each sample of the digital signal by +1 or −1 according to the M sequence signal generated by the sign sequence generator 42 at the timing defined by the M sequence signal which has been delayed by only the delay time τ. As a result, the phase of the Doppler signal from the measurement range is demodulated and a coherent signal having the Doppler frequency in the measurement range can be acquired.

In this case, a range side lobe level from the other ranges in the atmosphere becomes 1/N', assuming that the signal from the measurement range has a strength of 1 after it has been demodulated and the number of bits of the M sequence signal is N'. Therefore, by increasing the number N' of bits of the M sequence signal, the range side lobe level can be reduced to a negligible value.

The demodulated signal obtained by the demodulator 24 is sent to the coherent integrator 22. At this time, sampling intervals at which the demodulated signal is sampled are of an order corresponding to a desired distance resolution.

When receiving the demodulated signal from the demodulator, the coherent integrator 22 carries out a coherent integral of the demodulated signal and simultaneously acquires a spectrum of the Doppler signal by carrying out an FFT operation, etc. on the demodulated signal.

The air velocity detector 23 detects the air velocity in the direction of transmission of the light signal and in the measurement range from the spectrum acquired by the coherent integrator 22.

As can be seen from the above description, according to this embodiment 7, the laser radar apparatus transmits and receives light which consists of a modulated pseudo CW having a duty ratio of 100% and performs a demodulation process on the received light. Therefore, the present embodiment offers an advantage of being able to provide a desired S/N ratio in a short time and to carry out detection of the air velocity with a desired distance resolution.

In accordance with this embodiment 7, the laser radar apparatus selects one measurement range and detects the air velocity for the selected measurement range, as previously mentioned. As an alternative, the laser radar apparatus can select two or more measurement ranges, and two or more demodulators 24, two or more coherent integrators 22, and two or more air velocity detectors 23 can be disposed in parallel with one another for the two or more measurement ranges, respectively. This variant offers an advantage of being able to acquire a distribution of the air velocity in the atmosphere.

As previously mentioned, the laser radar apparatus in accordance with any one of above-mentioned embodiments 1 to 7 is applied to the case where the quality of scatterers to be measured is the drift speed of scatterers. However, the laser radar apparatus in accordance with the present invention is not limited to this example. For example, the laser radar apparatus in accordance with the present invention can be also applied to a case where the quality of scatterers is the location or reflectance of scatterers.

For example, when the scatterers in the atmosphere are a hard target, such as an automobile, the laser radar apparatus only has to change the delay time τ of the demodulator 24, determine the delay time τ at which an integral value in the coherent integral result is maximized, and detects the location of the scatterer from a distance corresponding to the integral value. Furthermore, the laser radar apparatus only has to detect the reflectance of the scatterer from the integral value in the coherent integral result.

INDUSTRIAL APPLICABILITY

As mentioned above, the laser radar apparatus according to the present invention is suitable for transmitting and receiving laser light, detecting the quality of scatterers, and determining the drift speed, location and reflectance of the scatterers.

The invention claimed is:

1. A laser radar apparatus comprising:
an oscillator that generates a modulating signal;
a modulator that intensity-modulates a light signal using the modulating signal generated by said oscillator;
a transmitter that transmits the light signal intensity-modulated by said modulator into an atmosphere;
a receiver that receives a light signal from the atmosphere when the transmitter transmits the light signal into the atmosphere;
a photoelectric converter that converts an intensity-modulated component contained in the light signal received by said receiver into an electric signal;
a frequency converter that converts a frequency of the electric signal outputted from said photoelectric converter into a baseband frequency using the modulating signal generated by said oscillator; and
a detector that carries out a coherent integral of the electric signal whose frequency has been converted by said frequency converter so as to detect a quality of scatterers which exist in the atmosphere from a result of the coherent integral.

2. The laser radar apparatus according to claim 1 wherein said oscillator generates the modulating signal which consists of a continuous wave.

3. The laser radar apparatus according to claim 1, wherein said oscillator generates a pulse signal having a time width equivalent to a desired distance resolution as the modulating signal.

4. The laser radar apparatus according to claim 1, wherein said oscillator generates the modulating signal using a sign sequence which consists of signs each of which is + or −.

5. A laser radar apparatus comprising:
an oscillator that generates a modulating signal;
a modulator that intensity-modulates a light signal using the modulating signal generated by said oscillator;
a transmitter that transmits the light signal intensity-modulated by said modulator into an atmosphere;
a receiver that receives a light signal from the atmosphere when said transmitter transmits the light signal into the atmosphere;
a photoelectric converter that converts an intensity-modulated component contained in the light signal received by said receiver into an electric signal;
a frequency converter that converts a frequency of the electric signal outputted from said photoelectric converter into a baseband frequency using the modulating signal generated by said oscillator; and
a detector that carries out a coherent integral of the electric signal whose frequency has been converted by said frequency converter so as to detect a quality of scatterers which exist in the atmosphere from a result of the coherent integral, wherein said detector converts the analog electric signal whose frequency has been converted by said frequency converter into a digital signal, and divides the digital signal into parts with time gates each of which has a time width determined by a reciprocal of a desired speed resolution, and carries out a coherent integral of the digital signal for each of the time gates, while carrying out a coherent integral of results of the coherent integral for the time gates.

6. A laser radar apparatus comprising:
an oscillator that generates a modulating signal;
a modulator that intensity-modulates a light signal using the modulating signal generated by said oscillator;
a transmitter that transmits the light signal intensity-modulated by said modulator into an atmosphere;
a receiver that receives a light signal from the atmosphere when said transmitter transmits the light signal into the atmosphere;
a photoelectric converter that converts an intensity-modulated component contained in the light signal received by said receiver into an electric signal;
a frequency converter that converts a frequency of the electric signal outputted from said photoelectric converter into a baseband frequency using the modulating signal generated by said oscillator; and
a detector that carries out a coherent integral of the electric signal whose frequency has been converted by said frequency converter so as to detect a quality of scatterers which exist in the atmosphere from a result of the coherent integral,
wherein when generating the modulating signal, said oscillator determines a carrier frequency of the modulating signal so that a multiplication of the carrier frequency and coherent time of the modulating signal agrees with a predetermined value.

7. The laser radar apparatus according to claim 1, wherein said frequency converter includes a mixer for mixing the electric signal outputted from said photoelectric converter and the modulating signal generated by said oscillator.

8. The laser radar apparatus according to claim 7, wherein when two or more oscillators are disposed, said frequency converter mixes modulating signals generated by said two or more oscillators and the electric signal, respectively.

9. The laser radar apparatus according to claim 1, wherein one optical member is provided with a function of said transmitter and a function of said receiver.

10. The laser radar apparatus according to claim 1, wherein said transmitter amplifies the light signal intensity-modulated by said modulator and then transmits the amplified light signal into the atmosphere, and said receiver amplifies the light signal received thereby from the atmosphere and then removes unnecessary frequency components contained in the received light signal.

11. The laser radar apparatus according to claim 1, wherein said photoelectric converter includes a photodetector for detecting an intensity-modulated component contained in the light signal received by said receiver.

12. The laser radar apparatus according to claim 1, wherein an optical fiber cable is provided for connecting between said modulator and said transmitter and an optical fiber cable is provided for connecting between said receiver and said photoelectric converter.

13. The laser radar apparatus according to claim 12, wherein all or part of said optical fiber cables are multimode fibers.

14. The laser radar apparatus according to claim 12, wherein said optical fiber cable that connects between said modulator and said transmitter is a single mode fiber, and said optical fiber cable that connects between said receiver and said photoelectric converter is a multimode fiber.

15. The laser radar apparatus according to claim 1, wherein said photoelectric converter includes a heterodyne detector for carrying out a heterodyne detection of both the light signal received by said receiver and local light, and an envelope detector for detecting an envelope of a detection signal from said heterodyne detector.

* * * * *